United States Patent
Ramakrishnan et al.

(10) Patent No.: US 8,477,631 B2
(45) Date of Patent: Jul. 2, 2013

(54) DYNAMIC LOW POWER RADIO MODES

(75) Inventors: Sthanunathan Ramakrishnan, Bangalore (IN); Bijoy Bhukania, Bangalore (IN); Jawaharlal Tangudu, Bangalore (IN); Sarma S Gunturi, Bangalore (IN); Jaiganesh Balakrishnan, Bangalore (IN); Rakesh Kumar, Ghazipur (IN); Abhijit Kumar Das, Bangalore (IN); Yogesh Darwhekar, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 605 days.

(21) Appl. No.: 12/546,867

(22) Filed: Aug. 25, 2009

(65) Prior Publication Data

US 2011/0051639 A1    Mar. 3, 2011

(51) Int. Cl.
*H04B 7/00* (2006.01)

(52) U.S. Cl.
USPC .......................................... 370/241; 370/310

(58) Field of Classification Search
None
See application file for complete search history.

(56) References Cited

U.S. PATENT DOCUMENTS

| | | | |
|---|---|---|---|
| 2003/0067963 A1* | 4/2003 | Miller et al. | 375/130 |
| 2004/0160906 A1* | 8/2004 | Greszczuk et al. | 370/311 |
| 2005/0143045 A1* | 6/2005 | Jiguet et al. | 455/343.1 |
| 2007/0205872 A1* | 9/2007 | Kim et al. | 340/10.33 |
| 2008/0207152 A1* | 8/2008 | Welborn | 455/142 |
| 2009/0068972 A1* | 3/2009 | Jin et al. | 455/245.1 |

* cited by examiner

*Primary Examiner* — Kevin C Harper
(74) *Attorney, Agent, or Firm* — Wade J. Brady, III; Frederick J. Telecky, Jr.

(57) ABSTRACT

A receiver in a packet based communication system includes a programmable block and a detection block that detects at least one of an operating condition of the receiver and a protocol condition of the communication system. Further, the receiver includes a control circuit coupled to the programmable block that controls the programmable block to transition to a set of radio modes according to at least one of the operating condition and the protocol condition.

22 Claims, 11 Drawing Sheets

FIG. 1A

| PACKET DETECTION | | | | |
|---|---|---|---|---|
| PROGRAMMABLE BLOCK | TYPICAL INTERFERENCE, LOW DATA RATE MODE | TYPICAL INTERFERENCE, HIGH DATA RATE MODE | HIGH INTERFERENCE, LOW DATA RATE MODE | HIGH INTERFERENCE, HIGH DATA RATE MODE |
| DCO | LP | HP | HP | HP |
| SIGMA DELTA IN ADPLL | LP | LP | HP | HP |
| LO BUFFER AND DIVIDER | LP | LP | LP | LP |
| LNA, TA+MIXER | LP | LP | LP | LP |
| ADC CLOCK | LP | LP | HP | HP |
| ADC | LP | LP | LP | LP |
| FILTER | LP | LP | HP | HP |
| LOOP FILTER | LP | HP | LP | HP |

| PACKET DECODING | | | | |
|---|---|---|---|---|
| BLOCK | LOW DATA RATE MODE, TYPICAL INTERFERENCE | HIGH DATA RATE MODE, HIGH INTERFERENCE | HIGH DATA RATE MODE, TYPICAL INTERFERENCE | HIGH DATA RATE MODE, HIGH INTERFERENCE |
| DCO | LP | HP | HP | HP |
| DIVIDER, LO BUFFER, SIGMA DELTA IN ADPLL | LP | HP | LP | HP |
| LNA, TA + MIXER | HP | HP | HP | HP |
| ADC CLOCK | LP | HP | LP | HP |
| ADC | HP | HP | HP | HP |
| FILTER | HP | HP | HP | HP |
| LOOP FILTER | LP | LP | HP | HP |

FIG. 12

US 8,477,631 B2

DYNAMIC LOW POWER RADIO MODES

TECHNICAL FIELD

Embodiments of the disclosure relate to low power radio modes in receivers used in communication systems.

BACKGROUND

A number of communication applications are being embedded into the handheld communication devices including mobile phones, for example, Bluetooth and wireless local area network (WLAN) applications. Battery life is a concern for mobile phones that include such communication applications. For example, battery of a mobile phone incorporating WLAN application discharges in a few hours. Further, it limits the deployment and acceptability of WLAN in mobile phones. This problem would be accentuated when WLAN.11 standard is incorporated into mobile phones.

Conventional radio chips tackle this issue by saving power using an application sensitive power management module in the mobile phone that decides to switch the radio into an active mode or a deep sleep mode. For example, the power management module may put the radio in deep sleep mode between beacon receptions. However, there are other protocol conditions including listen mode, active reception and scan mode. In conventional approaches, the radio chip is not designed to extract the lowest power under such protocol conditions. There is a need to have an intelligent radio chip design that reduces power consumption under any protocol condition.

SUMMARY

An exemplary embodiment provides a receiver in a packet based communication system. The receiver includes a programmable block and a detection block that detects at least one of an operating condition of the receiver and a protocol condition of the communication system. Further the receiver includes a control circuit coupled to the programmable block that controls the programmable block to transition to a set of radio modes according to at least one of the operating condition and the protocol condition.

An exemplary embodiment provides a method for implementing low power modes in a communication system. At least one of an operating condition of the receiver and a protocol condition of the communication system is detected from an input signal. Further, a programmable block in the receiver is controlled to transition between a set of radio modes according to at least one of the operating condition and the protocol condition to reduce power consumption.

Another exemplary embodiment provides a method for using a set of radio modes in a receiver. An operating condition of a programmable block in the receiver is detected by detecting at least one of an interference level in the receiver, strength of a received signal, multipath channel condition and data rate of packets of the received signal. A protocol condition of the communication system is then detected by detecting at least one of a listen state, a packet decode state and a silent state. The listen state indicates a state when the receiver listens for a packet, the packet decode state indicates a state when the receiver decodes information in the packet, and the silent state indicates a state when data is known to be absent in the medium or when unnecessary data is present. Further, a set of radio modes is selected according to the operating condition and the protocol condition. The set of radio modes includes at least one of a packet detection mode, a packet decoding mode, a semi sleep mode and a deep sleep mode.

Other aspects and example embodiments are provided in the Drawings and the Detailed Description that follows.

DETAILED DESCRIPTION OF THE EMBODIMENTS

Embodiments described herein provide dynamic low power radio modes for a communication device in a packet based communication system, for example WLAN and wireless personal area network (WPAN) systems (for example Bluetooth, WiFi, and Zigbee). Various embodiments are illustrated using WLAN as an example, but it will be appreciated that embodiments may find applications in any packet based communication systems. One embodiment provides a dynamic low power receiver that dynamically optimizes power consumption based on protocol condition and operation condition of the communication system and operating condition of the receiver. Another embodiment provides a method for implementing dynamic low power radio modes. Another embodiment provides a method for using a set of radio modes according to an operating condition and a communication protocol condition in a receiver. Another embodiment provides a method for sensing operating conditions of the receiver. Another embodiment provides a method for reducing transition time between the radio modes.

In various embodiments operating condition of the receiver refers to at least one of the interference level in the receiver (interference from other channels of frequency closer to the current operating channel of the receiver), strength of the signal received, data rate of the packets of the received signal and multipath channel condition. In various embodiments a protocol condition of the communication system refers to a listen state, a packet decode state or a silent state. The listen state indicates a state when the receiver listens for a packet either for receiving data or for checking the channel availability before transmission as part of the carrier sense multiple access-collision avoidance (CSMA-CA) mechanism. The packet decode state indicates a state when the receiver decodes information in the packet. The silent state indicates a state when data is known to be absent in the medium or when unnecessary data is present in the medium. Further, in various embodiments the set of radio modes includes collection of settings for different programmable blocks of the receiver based on the performance requirements mandated by a particular operating condition of the receiver and the protocol condition of the communication system.

Radio modes according to various embodiments include a packet detection mode, a packet decoding mode, a semi sleep mode and a deep sleep mode. Packet detection mode corresponds to the protocol condition of listen state when the receiver detects a preamble of the data packet. The semi sleep mode corresponds to the silent state. In the semi sleep mode, the receiver is idle and is ready for a rapid transition to any of the set of radio modes. The deep sleep mode corresponds to the silent state. In deep sleep mode the receiver is deactivated.

Embodiments are best understood in relation to FIGS. 1-12 of the drawings, like numerals being used for like elements of the various drawings.

Figure 1A:
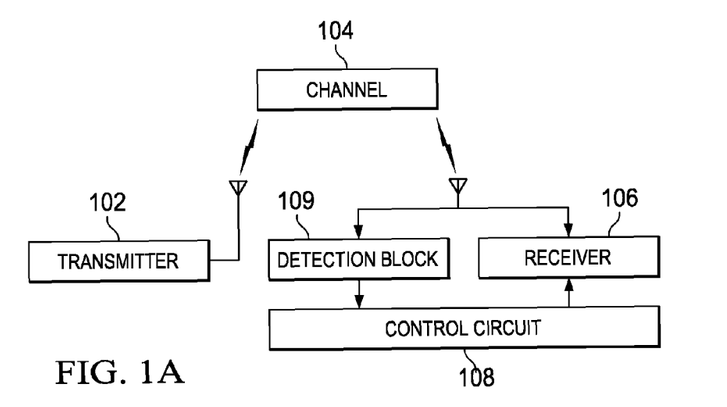
FIG. 1A illustrates an example environment in which several embodiments can be implemented.

FIG. 1A is a block diagram of an example environment in which several embodiments can be implemented. A packet based communication system, for example a WLAN system, is shown that includes a transmitter 102 and a receiver 106 with antennas, a control circuit 108 and a detection block 109. The transmitter 102 transmits data through the channel 104. The detection block 109 detects protocol condition of the communication system and operating condition of the receiver 106 from the signals of the receiver and passes this information to the control circuit 108. Control circuit 108 in turn selects an appropriate control signal that enables various programmable blocks (explained in detail in conjunction with the explanation of FIG. 1B) of the receiver 106 to transition to various radio modes based on the operation condition and protocol condition. Each programmable block is adjustable over the set of radio modes by varying the control signal to the block. The control circuit 108 includes a processor and associated circuitry that delivers appropriate control signals to the programmable blocks. The control signals include digital signals or analog signals.

In general, WLAN includes two primary spectral regions namely 802.11b/11g and 802.11a. WLAN has multiple data rates, also called as modulation modes, ranging from 1 Mbps to 11 Mbps in 11b mode and 6 Mbps to 54 Mbps in orthogonal frequency division multiplexing (OFDM) modes. Signal to noise ratio (SNR) requirements range from 0 db to 13 dB for 11B and 5 dB to 30 dB for OFDM modes. Typically, each data packet includes a preamble that is primarily detected before further processing in the packet detection mode. SNR requirements for packet detection include −2 dB in 11b and 3 dB in OFDM modes. It is noted that nearly 97% of the active time of the receiver is spent in listening to the channel in real networks. There are also instances when data is known to be absent in the medium for a time period in the order of a few microseconds (4 microseconds in 11a and 13 microseconds in 11b/11g).

In typical communication scenario, the amount of adjacent channel interference (ACI) or cellular blocker varies during a normal operation. The ACI strength depends on the distance of the station (STA) from adjoining access points (AP). The strength of the cellular blockers depends on the distance of the mobile phone from the cellular base station because the transmitter power from the handset is controlled by power control mechanisms which reduce the transmission power if the mobile phone is closer to the base station. Typically, the ACI and cellular blocker levels are lower than the largest values in the specification. Data rate depends on the strength of the received signal power at the station.

Figure 1B:
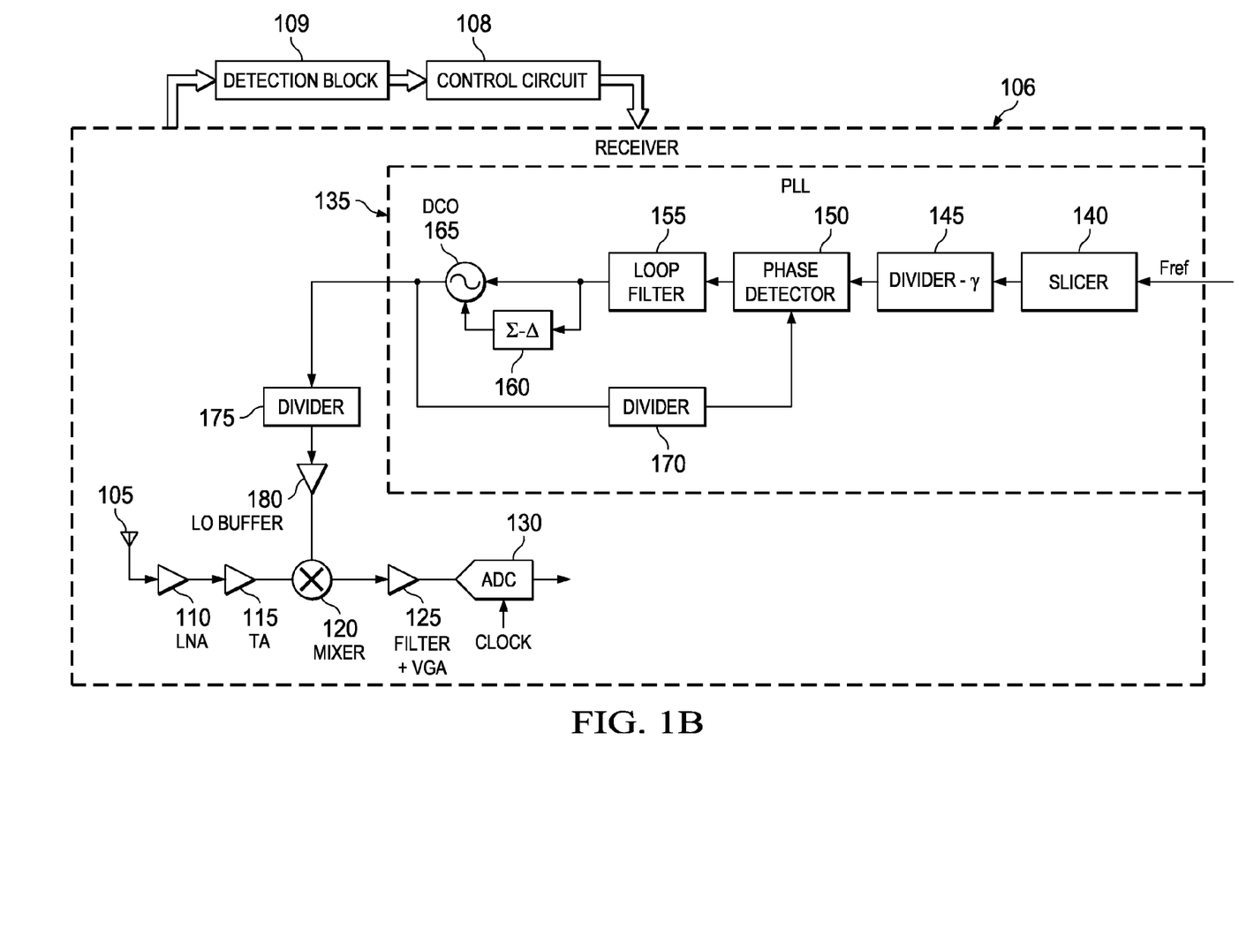
FIG. 1B illustrates a receiver according to an embodiment.

A brief conceptual description of the programmable blocks of the receiver is provided in FIG. 1B. In general, FIG. 1B illustrates the receiver 106 with the programmable blocks, the detection block 109 and the control circuit 108. The programmable blocks shown in the receiver 106 includes an antenna 105, a low noise amplifier (LNA) 110, a transconductance amplifier (TA) 115, a mixer 120, a filter and variable gain amplifier (VGA) 125 and an analog-to-digital converter (ADC) 130. The receiver 106 further includes a phase locked loop (PLL) 135. PLL 135 includes a slicer 140, a divider 145, a phase detector 150, a loop filter 155, a digitally controlled oscillator (DCO) 165 and a sigma-delta ($\Sigma$-$\Delta$) modulator 160. The receiver 106 also includes a divider 175 and a local oscillation (LO) buffer 180.

The LNA 110 comprises a type of electronic amplifier or amplifier used in communication systems to amplify very weak signals captured by the antenna 105. LNA 110 is used to reduce noise of all subsequent stages by the gain of the LNA and also to boost the desired signal power while adding as little noise and distortion as possible so that the retrieval of the signal is possible in later stages in the system. To minimize the losses in the feed-line, LNA 110 is located very close to the antenna 105 or in the front-end of the receiver 106.

The TA 115 generates a current output proportional to a voltage input. After the voltage to current conversion, the current signal is passed to the mixer. The mixer 120 includes a non-linear or time varying circuit that accepts two different frequencies as inputs and provides a mixture of signals as output at several frequencies. These signals may include a sum of the frequencies of the input signals. In some cases, the mixer 120 can be a down conversion mixer or frequency conversion block. The mixer 120 receives one input from the TA 115 and another input from the local oscillator (LO) buffer 180.

The LO buffer 180 receives the clock frequency generated by the PLL and dividers and provides higher output drive strength thereby ensuring that the clock phase noise is not degraded when it has to drive a long line to the mixer. The LO buffer 180 produces a signal which is supplied to the mixer 120 along with the signal from the TA 115 in order to effectively change the antenna signal by heterodyning to produce the sum and difference of that signal one of which will be at the intermediate frequency (can be zero intermediate frequency also).

A slicer 140 in the PLL 135 receives a reference frequency which is passed to the divider 145. The phase detector 150 compares the reference frequency and the actual frequency and also the phases. The phase detector 150 adds an error due to the phase differences of the two frequencies. A loop filter 155 corrects for this error. The loop filter 155 is a basic low pass filter (LPF). The receiver 135 further includes a DCO 165 receiving an output from the loop filter 155. The DCO 165 is an oscillator designed to be controlled according to an input. The frequency of the oscillations may be varied according to the input given. The DCO 165 gives a particular resolution. If resolution lower than the particular resolution required, the $\Sigma$-$\Delta$ modulator 160 is used. The $\Sigma$-$\Delta$ modulator 160 switches between two integer values at a fast rate to achieve a required average value that improves the resolution of the DCO 165. In some implementations a voltage controller oscillator (VCO) may be used instead of the DCO 165. In the case of the use of VCO, the Σ-Δ modulator 160 is not required. Output of the DCO 165 is fed back to the phase detector 150 after dividing down using the divider 170 and also fed to the divider 175. Output of the divider 175 is fed to the LO buffer. An output of the mixer 120 is provided to the filter and VGA block 125. Filter removes unwanted signals and the VGA varies its gain depending on a control voltage.

The ADC 130 converts the analog signal input to a digital signal by sampling the analog signal based on a clock input. Various programmable blocks of receiver 106 in FIG. 1B are shown merely for the purpose of illustration. It is noted that the receiver 106 may contain more or fewer programmable blocks or components.

Performance expectations from the receiver changes depending on the operating conditions. Few examples of such performance expectations are described below. In a lower blocker or interferer power condition, poor linearity and far-end phase noise is acceptable. Poor signal filtering is also acceptable. In a lower modulation mode, the signal to noise ratio (SNR) requirement is lower. In this case, in-band phase noise degradation and IQ mismatch degradation is acceptable. At high signal power the thermal SNR does not dominate. In this case, the thermal noise figure (NF) of the system can be degraded with a minimal impact on the system SNR. Packet detection requires lower SNR relative to the requirement for decoding a packet. So in packet detection mode, NF of the system can be degraded without affecting overall performance of the system. From the aforementioned conditions it is clear that performance of different programmable blocks can be degraded under different operating conditions to optimize power consumption. Various embodiments intelligently make use of the performance requirements of various programmable blocks at various operating conditions to reduce power consumption. To explain this further, impact of various programmable blocks on performance is discussed below.

Specifically the impact of LNA 110, TA 115 and mixer 120, DCO 165, slicer 140, LO buffer 180 and dividers 175, 170, 145, Σ-Δ modulator 160, ADC 130, filter and VGA 125 on performance are discussed here. Reducing LNA 110 or TA 115 current degrades noise figure and linearity of the system thereby impacting sensitivity and blocker/interferer performance. In DCO 165, lower current increases both in-band and far end phase noise. In high interference or high data rate conditions, DCO 165 needs to be in high current mode. Slicer current reduction primarily degrades in-band phase noise. Hence slicer 140 needs to be in high current mode for high data rate conditions. Current reduction in LO buffer 180, dividers 175, 170, 145, and Σ-Δ modulator 160 increases far-end phase noise. Hence these programmable blocks need to be set in high current mode under high interference conditions. Clock rate reduction in ADC 130 causes aliasing of interferers and hence should be avoided in high interference conditions. Also, bit reduction in ADC 130 reduces the SQNR. Under benign multipath conditions ADC SNR and in-band phase noise can be degraded without impacting performance. Current reduction in filter and VGA block 125 has significant impact on the linearity of the system and minor impact on the noise figure of the system. Various embodiments consider these scenarios and conditions to intelligently design the low power radio modes which are explained below.

Radio modes according to various embodiments may be used according to the operating condition of the receiver and protocol condition of the communication system. For example, the packet detection mode may be used when the receiver is looking for a packet header in the listen mode and in active reception scenario. SNR required for packet detection is lower than that for packet decoding. Hence power consumption can be reduced in packet detection mode.

Packet decoding mode is an active mode that provides good SNR to decode the data packets. In this mode current consumption can be dynamically reduced if interference is lower and/or data rate is lower.

Semi sleep mode may be used when the system knows that there is no data in the medium for approximately greater than 2 microseconds. This mode does not have any performance requirements. However, in many cases the receiver is required to transition from sleep mode to any other mode in less than 1 microsecond. Hence the bias circuits are always 'just ON' in the semi sleep mode for analog baseband blocks to enable quick transition to normal or low power mode.

Deep sleep mode may be used when the system can be shutdown for approximately greater than 1 millisecond. Deep sleep mode has near zero power consumption. Various radio modes have sub-modes based on interference levels and expected data rate (operating condition of the receiver). Various embodiments achieve significant power reduction in listen mode and packet detection mode using slotted nature of medium access. Also, power consumption can be further reduced in scan by using slot time estimation.

In one embodiment, each programmable block includes three settings. First setting can be used when a programmable block requires highest current consumption and highest performance (normal mode). Second setting can be used when a programmable block requires lower current consumption and lower performance. Third setting would have minimum current consumption and yet good transition time to other settings (semi sleep mode). Performance expectations are low in the third setting. In one embodiment, these settings would be programmable to allow post-silicon tweaking. Further, a fourth setting can be used when a programmable block is inactive, which is used in the deep sleep mode. From the above it is clear that any required SNR under different operating conditions can be obtained by an appropriate setting of the programmable blocks in either high power or low power.

Figure 2A:
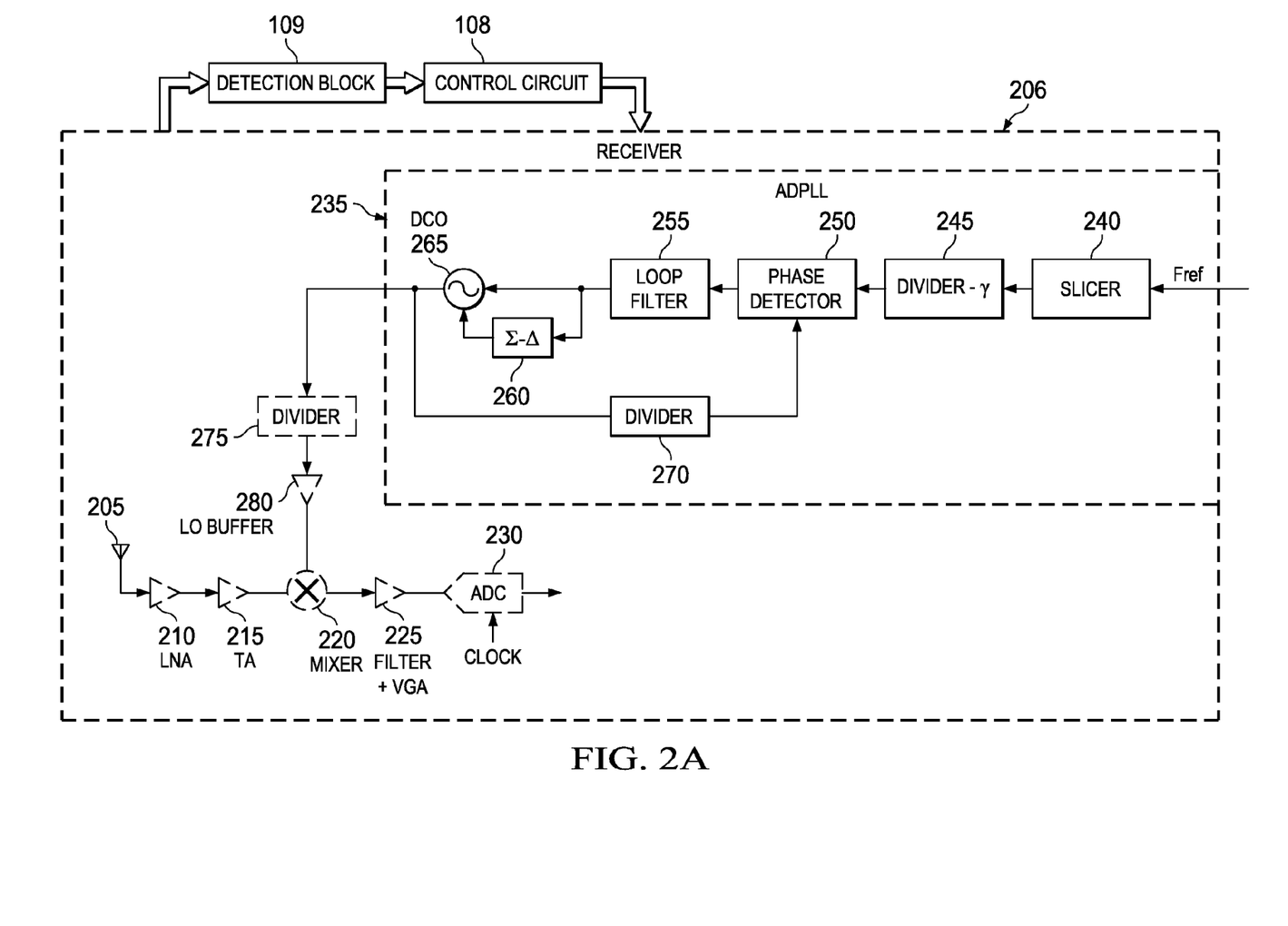
FIG. 2A illustrates a receiver in semi sleep mode according to an embodiment.
Figure 2B:
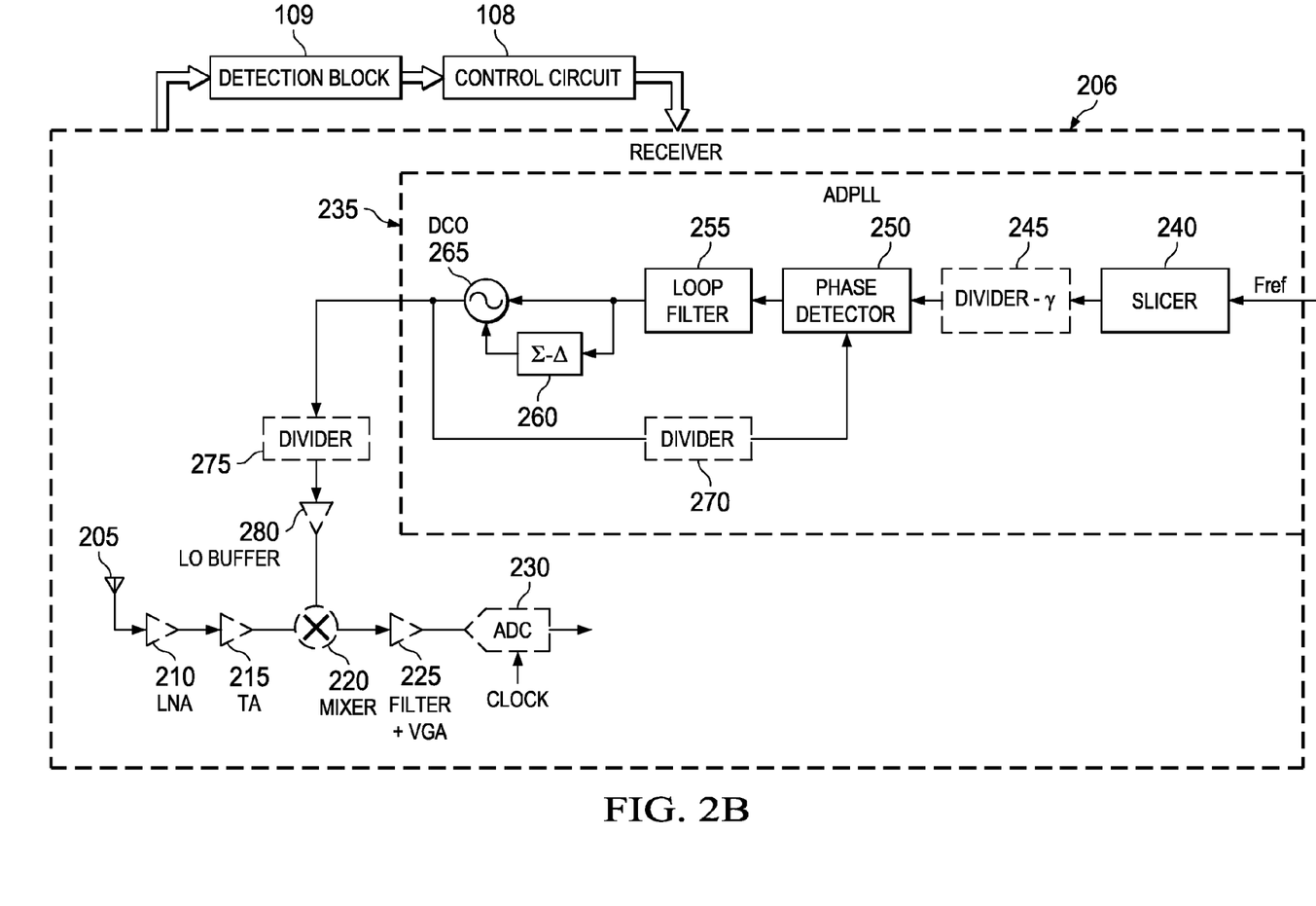
FIG. 2B illustrates a receiver in packet detection mode according to an embodiment.
Figure 2C:
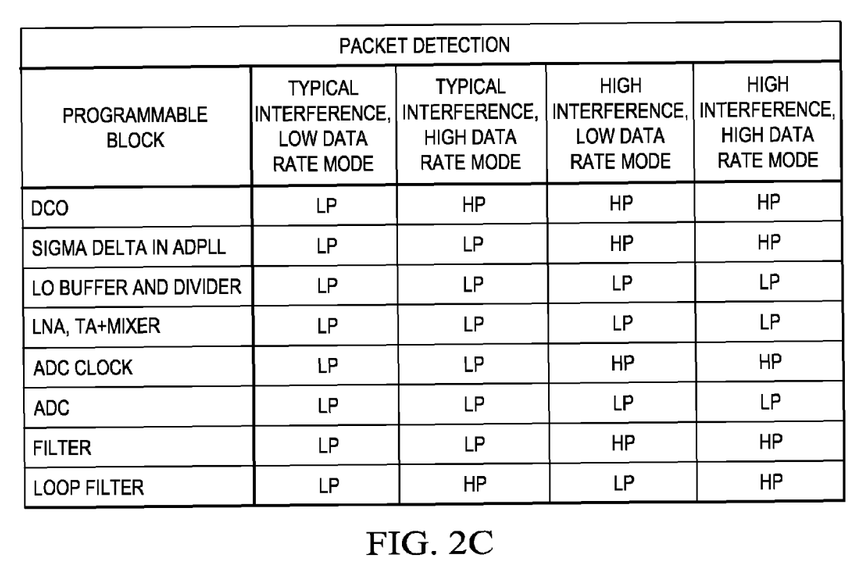
FIG. 2C is a table illustrating various sub-modes of the programmable blocks in packet detection mode according to an embodiment.
Figure 2D:
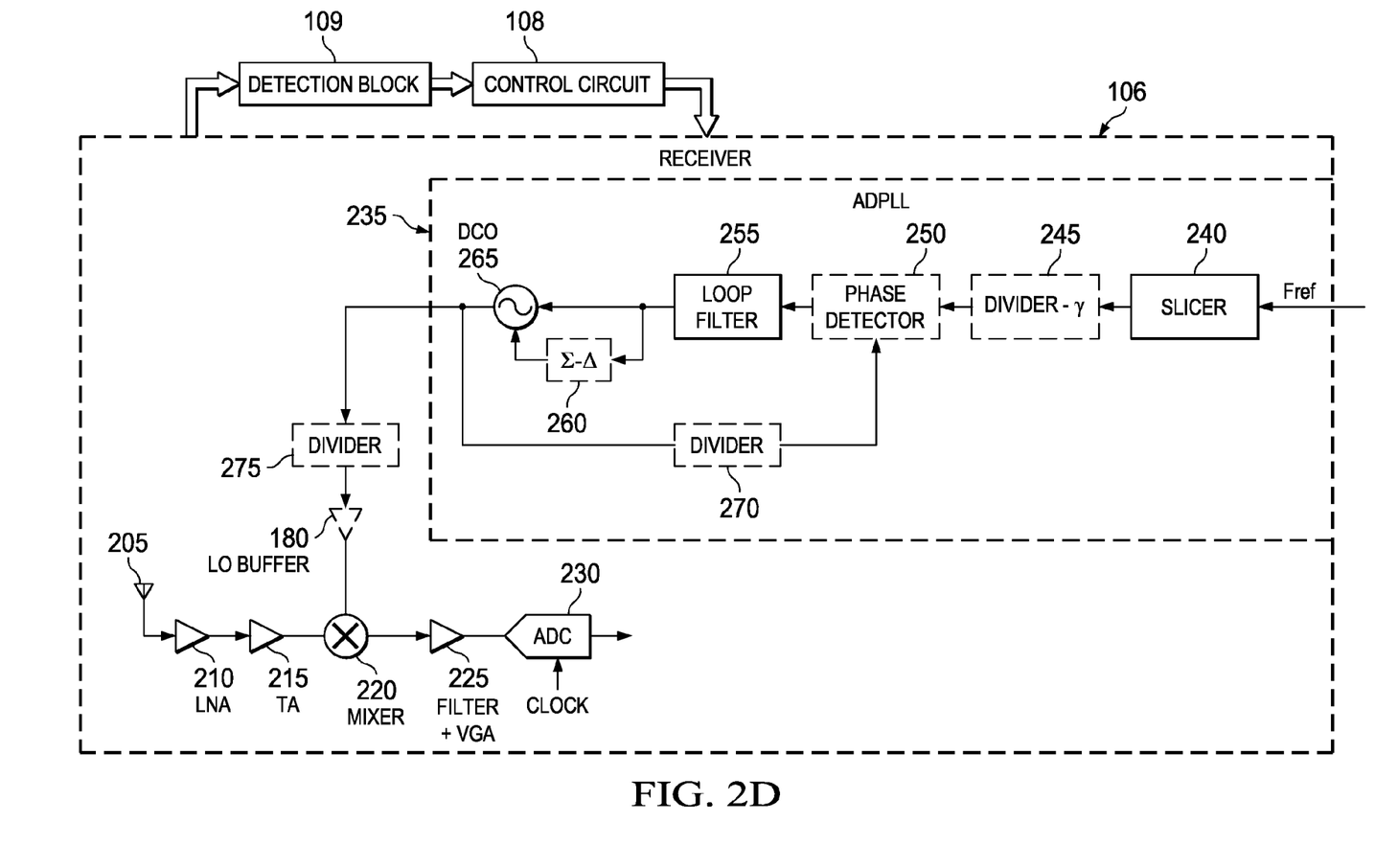
FIG. 2D illustrates a receiver in packet decoding mode according to an embodiment.

FIGS. 2A, 2B and 2D illustrate settings of various programmable blocks in the receiver 206 in various radio modes according to the embodiments. The receiver 206 includes programmable blocks, the detection block 109 and the control circuit 108. The programmable blocks shown in the receiver 206 includes an antenna 205, a LNA 210, a TA 215, a mixer 220, a filter and VGA 225, an ADC 230. The receiver 206 further includes a PLL 235. PLL 235 includes a slicer 240, divider 245, phase detector 250, loop filter 255, a DCO 265 and a Σ-Δ modulator 260. The receiver 206 also includes a divider 275 and a LO buffer 280. As noted above, the detection block 109 detects, from the signals from the receiver 206, and protocol condition of the communication system and operating condition of the receiver passes this information to the control circuit 108. Control circuit 108 in turn selects an appropriate control signal that enables each programmable block to transition to various radio modes based on the operation condition and protocol condition.

Referring now to FIG. 2A, settings of various programmable blocks of the receiver 106 in semi sleep mode are illustrated. As noted in FIG. 2A, LNA 210, TA 215, mixer 220, filter and VGA 225, ADC 230, LO buffer 280 and divider 275 are shown using dotted lines. These programmable blocks (with the dotted lines) include those blocks which are in semi sleep mode, according to an embodiment. Programmable blocks in the PLL 235 are either low power or high power mode depending on the setting.

Referring now to FIG. 2B, settings of various programmable blocks of the receiver 106 in packet detection mode with high data rate and high interference (operating conditions) are illustrated. As noted in FIG. 2B, LNA 210, TA 215, mixer 220, filter and VGA 235, ADC 230, LO buffer 280 and dividers 245, 270 and 275 are shown using dotted lines. These programmable blocks include those blocks which are in low power mode in packet detection mode with high data rate and high interference. Accordingly, slicer 240, phase detector 250, loop filter 255, Σ-Δ modulator 260 and DCO 265 are in high power mode. In one implementation, SNR requirement in listen state is approximately 2 dB for packet detection compared to 4.5 dB for decoding 6 Mbps bit rate and 21 dB for decoding 54 Mbps bit rate. It is noted that all programmable blocks in the PLL 235 needs to be in the mode corresponding to the packet decoding mode even for packet detection as PLL 235 requires longer time to settle.

Further explaining packet detection mode, FIG. 2C table illustrate various sub-modes of the programmable blocks in the receiver in packet detection mode according to an embodiment. In various embodiments interference refers to adjacent channel interference (ACI) conditions. It is noted that LNA 210, TA 215 and mixer 220 can be in low power mode irrespective of the data rate and interference in packet detection mode. In high interference high data rate mode, ADC current can be reduced to get lower signal-to-quantization noise ratio (SQNR). LO buffer 280 and divider 275 can also be in low power mode. In high interference low data rate mode, loop filter 255 is in low power mode since the SNR requirements is low. LO buffer 280 and divider 275 currents can also be reduced. In high interference high data rate mode, apart from LNA 210, TA 215 and mixer 220, LO buffer 280, divider and ADC 230 can be in low power mode. In typical interference high data rate mode, loop filter 255 and DCO 265 are in high power mode and the rest of the programmable blocks are in low power mode. In typical interference low data rate mode, all programmable blocks are in low power mode.

Transition from packet detection to packet decoding mode has to be performed such a way to avoid any performance degradation of the receiver. Transitions in the settings of different blocks can cause a gain change, which if uncorrected, would lead to performance degradation in the system. In one embodiment a digital AGC (not shown in the figures) in the receiver can be used to correct the gain changes during transitions.

Referring now to FIG. 2D, settings of various programmable blocks of the receiver 106 in packet decoding mode with high data rate and typical interference (operating conditions) are illustrated. As noted in FIG. 2D, dividers 245, 270 and 275, phase detector 250, Σ-Δ modulator 260 and LO buffer 280 are shown using dotted lines. These programmable blocks include those blocks which are in low power mode in packet decoding mode. Further, slicer 240, loop filter 255, DCO 265, LNA 210, TA 215, mixer 220, filter and VGA and ADC 230 are in high power mode.

Figure 2E:
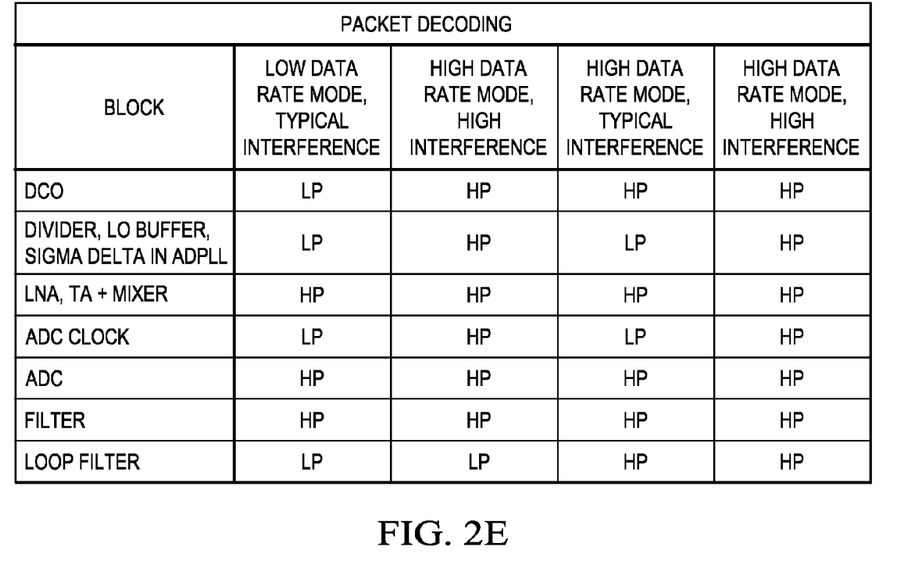
FIG. 2E is a table illustrating various sub-modes of the programmable blocks in packet decoding mode according to an embodiment.

Further explaining packet detection mode, FIG. 2E table illustrate various sub-modes of the programmable blocks in packet decoding mode according to an embodiment. It is noted that LNA 210, TA 215, mixer 220, ADC 230 and filter are in high power mode irrespective of the data rate and interference in packet decoding mode. Additionally, in low data rate typical interference mode, DCO 265, divider 270, LO buffer 280, Σ-Δ modulator 260 and loop filter 255 are in low power mode. In high data rate high interference mode, all programmable blocks are in high power mode except the loop filter 255. In high data rate typical interference mode, all programmable blocks are in high power mode except divider 270, LO buffer 280, Σ-Δ modulator 260 and ADC 230 clock are in low power mode. In high data rate high interference mode, all programmable blocks are in high power mode.

Various radio modes described as above are merely for illustration. It will be appreciated that other radio modes can also be designed using various embodiments. For example, settings of the programmable blocks can be mixed and matched to get desired SNR under any condition.

Figure 3:
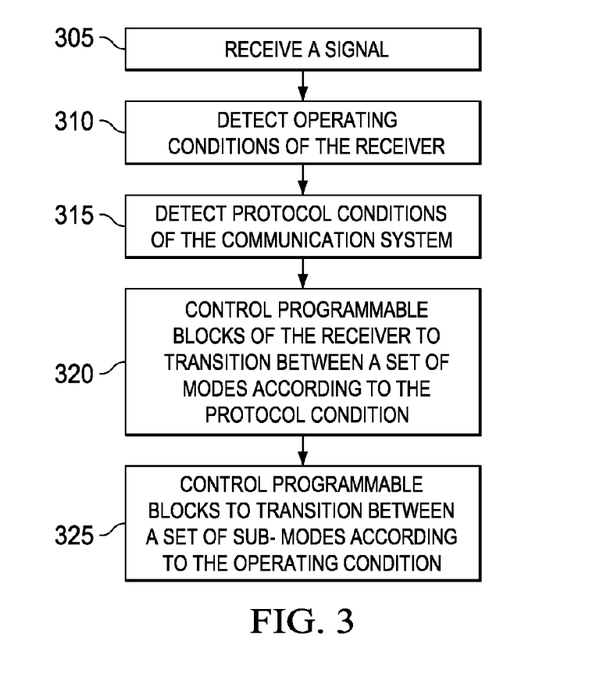
FIG. 3 is a flow diagram illustrating a method for implementing dynamic low power radio modes according to an embodiment.
Figure 4:
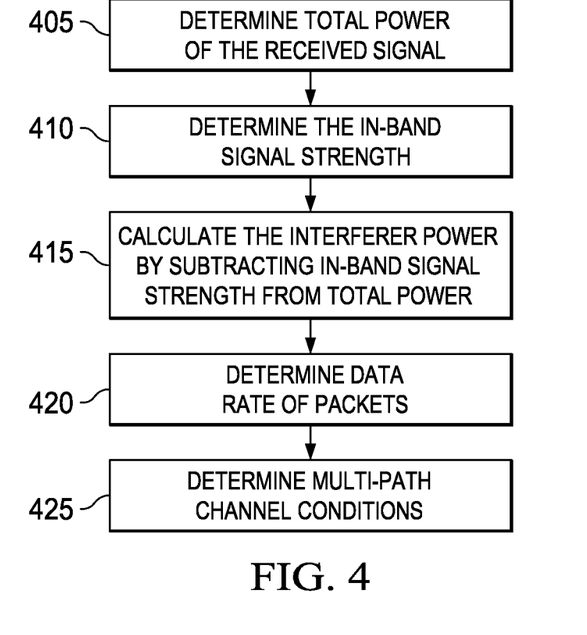
FIG. 4 is a flow diagram illustrating a method for detecting operating conditions of the receiver and data rates according to an embodiment.
Figure 5:
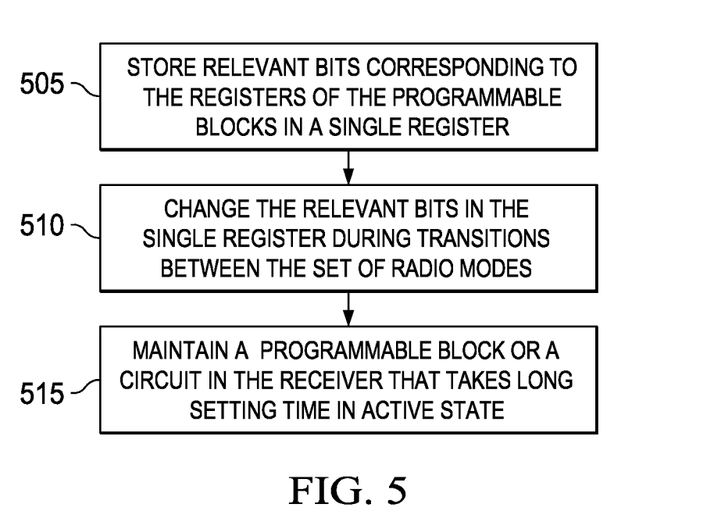
FIG. 5 is a flow diagram illustrating a method for reducing transition time between the radio modes according to an embodiment.

FIGS. 3-5 are flow diagrams illustrating various embodiments. These flow diagrams are described with respect to the device and components of FIGS. 2A, 2B and 2D merely for illustration. However, various features described herein can be implemented in other environments and using other components, as will be apparent to one skilled in the relevant arts by reading the disclosure provided herein. Furthermore, the steps in the flow diagram are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein.

FIG. 3 is a flow diagram illustrating a method for implementing dynamic low power radio modes. At step 305, a signal is received in a communication receiver, for example receiver 235. At step 310, operating conditions of the receiver are detected. Method of detecting the operating conditions of the receiver is explained in detail in conjunction with FIG. 4. At step 315, protocol conditions of the communication system is detected. Typically, protocol conditions can be determined from the communication standard. At step 320, various programmable blocks of the receiver are controlled to transition between a set of radio modes according to the protocol condition of the communication system as discussed earlier. Further at step 325, programmable blocks are controlled to transition between a set of sub-modes according to the operating condition of the receiver, as discussed earlier.

FIG. 4 is a flow diagram illustrating a method for detecting operating conditions of the receiver. Detecting the operating conditions is required to efficiently switch between various sub-modes accurately. Detection may be performed under the assumption that operating conditions of the receiver do not change rapidly. At step 405, total power of the received signal is determined. Total power of the received signal can be determined using the analog RSSI. RSSI power includes in-band power, interferer power and cellular blocker power. An RSSI circuit is provided in the receiver to measure interference powers at the antenna input so that appropriate radio modes are selected. At step 410, the in-band signal strength of the received signal is determined. In-band signal strength can be determined from power measurement in digital baseband after filtering out the ACI.

Further, interferer power is calculated by subtracting in-band signal strength from the total power of the received signal at step 415. The interferer power is measured before analog filter in the receiver to sense cellular blockers accurately. Data rate of the packets is determined at step 420. In one embodiment, power of the signal from the AP is used to determine the data rate. It is also noted that data rate of the packets do not change abruptly in communication applications. In certain situations data rate of the packet to be received is known prior to reception, for example beacon reception and channel scan, and the receiver can be tuned accordingly. On the other hand, even if the system is unable to determine the accurate data rate and/or interferer power, it can take a conservative decision and forego power savings. At step 425, multipath channel conditions are determined. Channel estimates from the baseband can be used to determine the severity of the multipath. For example, a metric determining the severity of the multipath can be the ratio of the maximum channel gain to the minimum channel gain in the frequency band of interest.

FIG. 5 is a flow diagram illustrating a method for reducing transition time between the radio modes according to an embodiment. Low transition time is critical to dynamically switch between various radio modes. For example in OFDM, transition time from packet detection to packet decoding mode should be performed within the guard time of 1.6 microseconds. In this case, approximately 0.6 microseconds is lost due to pipeline delay and errors to get the accurate boundary of the short sequence. Also, approximately 1 microsecond is available for settling all the programmable blocks. To enable proper transitions within the available 1 microsecond time, method illustrated in FIG. 5 may be used.

Referring to FIG. 5, at step 505, relevant bits corresponding to the registers of the programmable blocks are stored in a single register, called as a shadow register. At step 510, the relevant bits are changed in the single register during transitions between various modes rather than changing bits in every register of the programmable blocks. Shadow registers can be used with different current settings and bits corresponding to various radio modes can be enabled or disabled to reduce transition time between the modes. In implementation, relevant registers are multiplexed into analog by changing a single bit. This also saves register write time for the software application in the receiver. Further, at step 515, programmable blocks or circuits in the receiver that requires longer settling time is always maintained in active state. Circuits operating at radio frequency have very low transition time, for example approximately 50 nanoseconds. In circuits operating at baseband frequency, bias current is reduced to a minimum, but not down to 0, to keep the transistors just 'ON' thereby reducing transition time. When such circuits are switched to a high power mode, the settling is faster as the nodes do not need to charge from zero potential.

Figure 6:
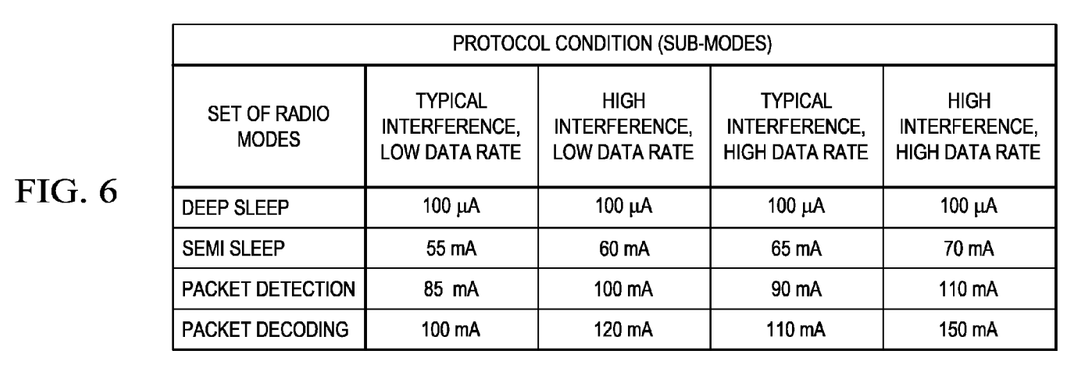
FIG. 6 is a table illustrating power consumption in various radio modes and respective sub-modes.

FIG. 6 is a table illustrating power consumption of the receiver in various radio modes and respective sub-modes according to various embodiments. It will be appreciated that the values as illustrated in the table is from one implementation and provided for mere illustration. In deep sleep mode the receiver consumes 100 microamperes of current. In semi sleep mode the receiver consumes 55 mA (milliampere), 60 mA, 65 mA and 70 mA for typical interference low data rate mode, high interference low data rate mode, typical interference high data rate mode and high interference high data rate mode respectively. In packet detection mode the receiver consumes 85 mA, 100 mA, 90 mA and 100 mA for typical interference low data rate mode, high interference low data rate mode, typical interference high data rate mode and high interference high data rate mode respectively. In packet decoding mode the receiver consumes 100 mA, 120 mA, 110 mA and 150 mA for typical interference low data rate mode, high interference low data rate mode, typical interference high data rate mode and high interference high data rate mode respectively.

Figure 7:
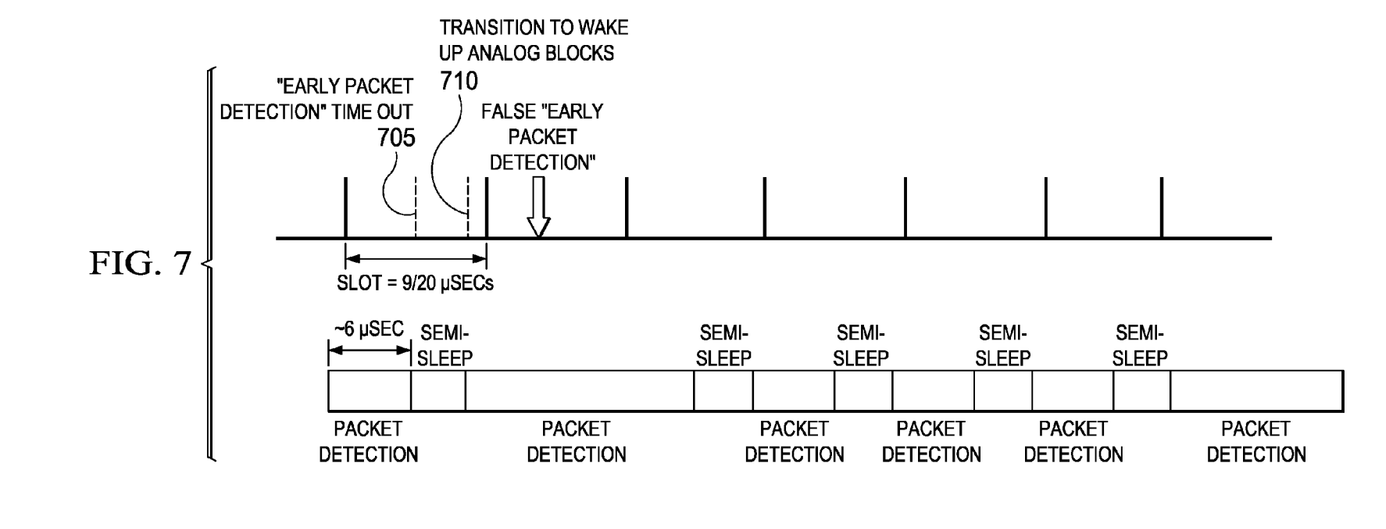
FIGS. 7-10 illustrate applications of the radio modes in various operating conditions of the receiver according to various embodiments.

FIGS. 7-10 illustrate applications of the dynamic radio modes in various operating conditions of the receiver according to various embodiments. FIG. 7 illustrates a timing diagram showing the operation of the receiver (106) in a listen mode operating condition. Initially the receiver is in a packet detection mode. The receiver waits for a timeout from the beginning of a slot (a slot is a time duration of either 9 or 20 microseconds). If there is no packet detected by the receiver within this timeout (705), the control circuit 208 switches the receiver to a semi sleep mode and then transition to packet detection mode again just before the beginning of the next slot (710). If there is an event of false packet detection, the receiver looks for confirmation of detection. If detection is not confirmed the control circuit 208 switches the receiver back to the same mode of operation as described above. If there is actual packet detection, the receiver transitions to the packet decoding mode.

Figure 8:
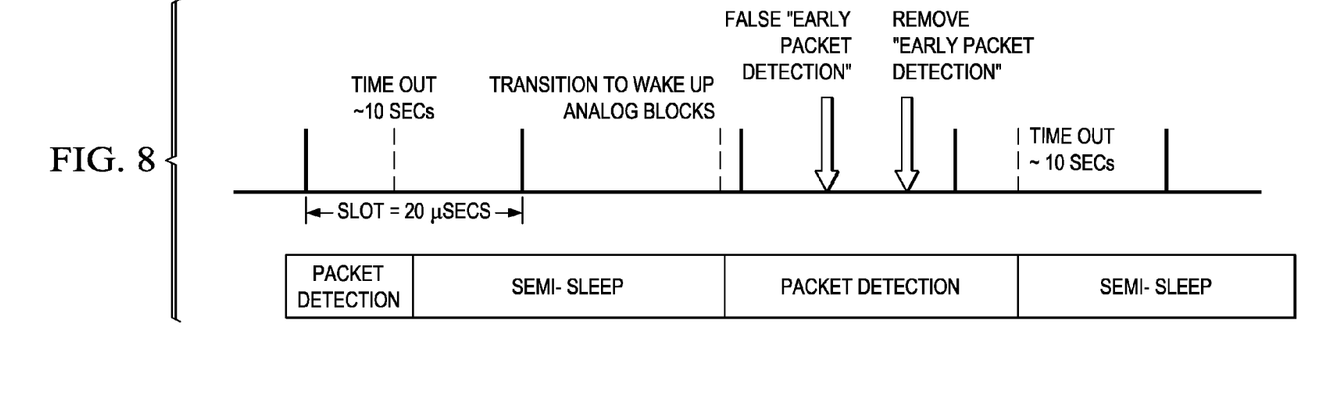

FIG. 8 illustrates listen mode operating condition in a 802.11b only WLAN network. It is noted that the operation of FIG. 8 timing diagram is similar to that of FIG. 7 as explained above. Since the preamble time is longer in 802.11b, the semi sleep time can be increased to extend the next slot as well without any significant degradation in preamble detection.

Figure 9:
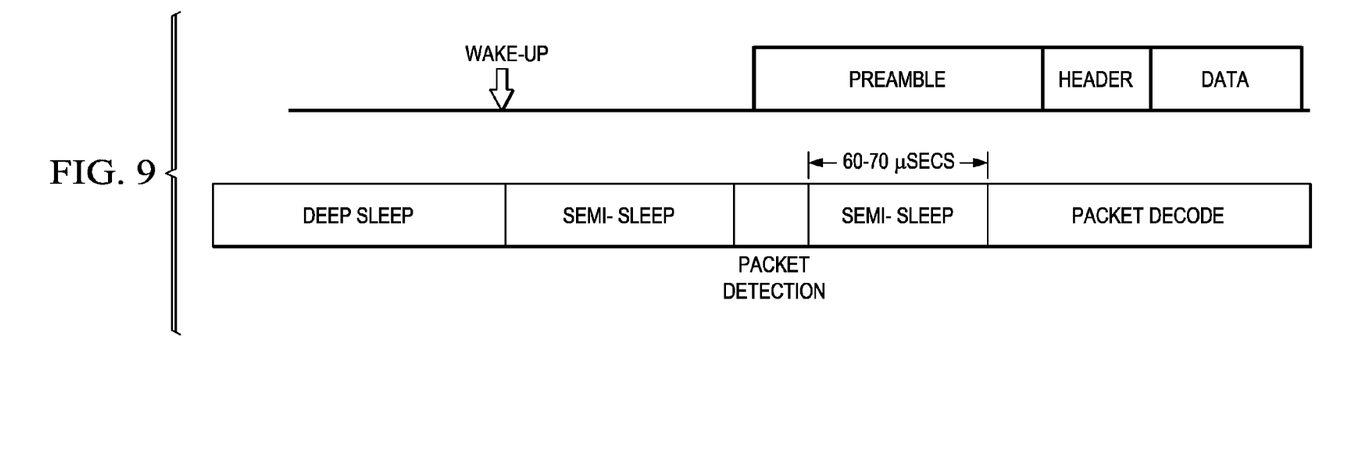

FIG. 9 illustrates the beacon reception operating condition. In this condition the receiver wakes up from deep sleep mode into a 'version' of a semi sleep mode where only the PLL (135) is active. Once the PLL 135 is settled, the receiver transitions to a packet detection mode where it attempts to decode the beacon packet. Once the beacon packet is detected, about 60-70 microseconds can be spent in semi sleep mode (in 802.11b/g) as the preamble length is significantly high.

Figure 10:
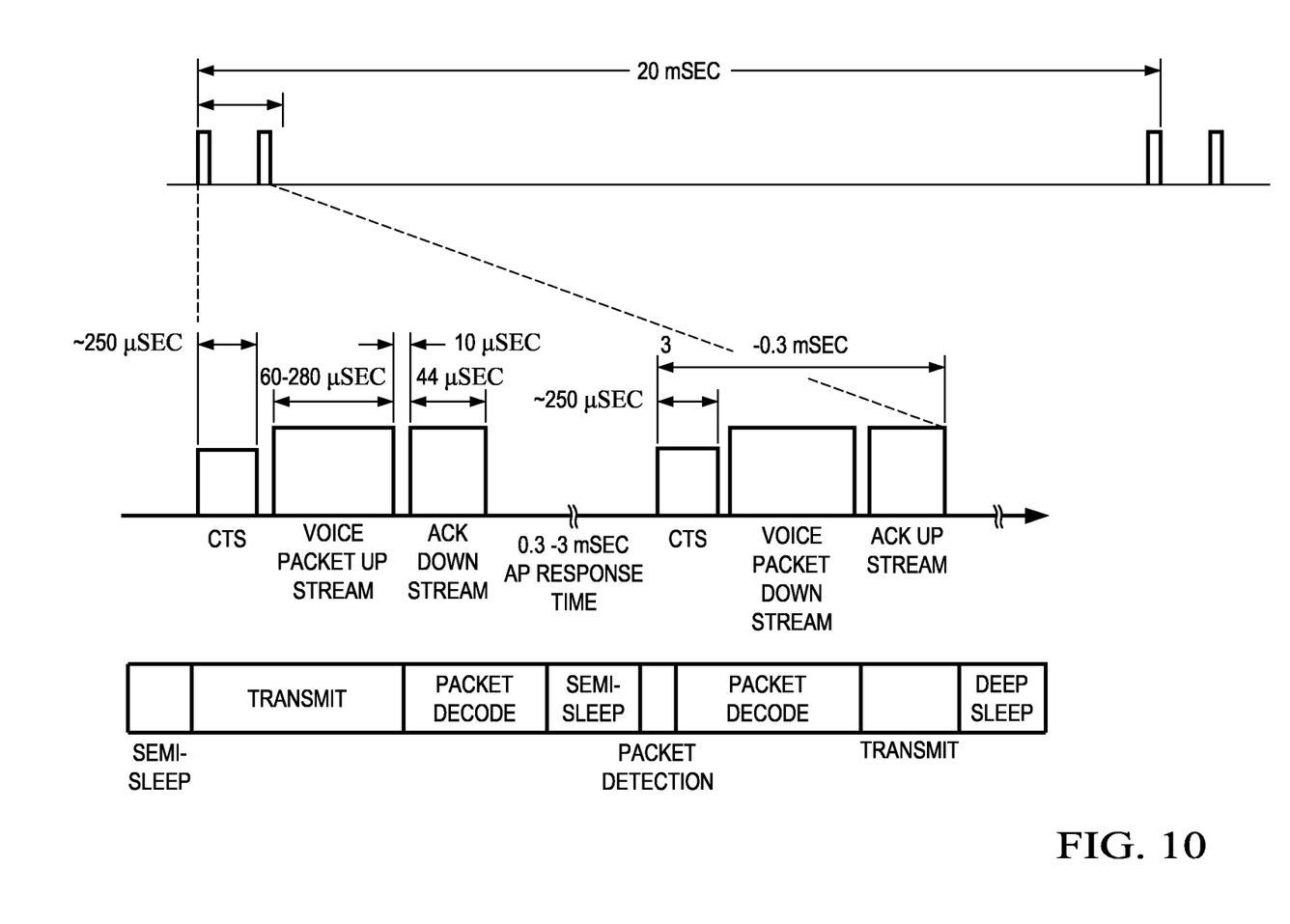

FIG. 10 illustrates timing diagram of an embodiment in a voice over IP application. In VoIP scenario the STA (station) wakes up at a predetermined time, transmits a CTS (clear-to-send) packet to reserve the channel for the duration of the packet exchange, transmits its voice data to the access point (AP) and then receives an ACK from the AP for the voice packet. After a variable time, ranging from 0.3 to 3 milliseconds, AP responds with a CTS and the voice packet intended for the STA. The receiver responds with an ACK and then transitions to deep sleep and wakes up again after a predetermined time period and the process continues. FIG. 10 illustrates the actual mechanism by which this operation is performed and also describes the radio modes that can be used in this scenario. If the AP response time (0.3-3 milliseconds AP response time in the figure) is deterministic then the system can be in semi sleep mode, else it has to be in packet detection mode.

Figure 11:
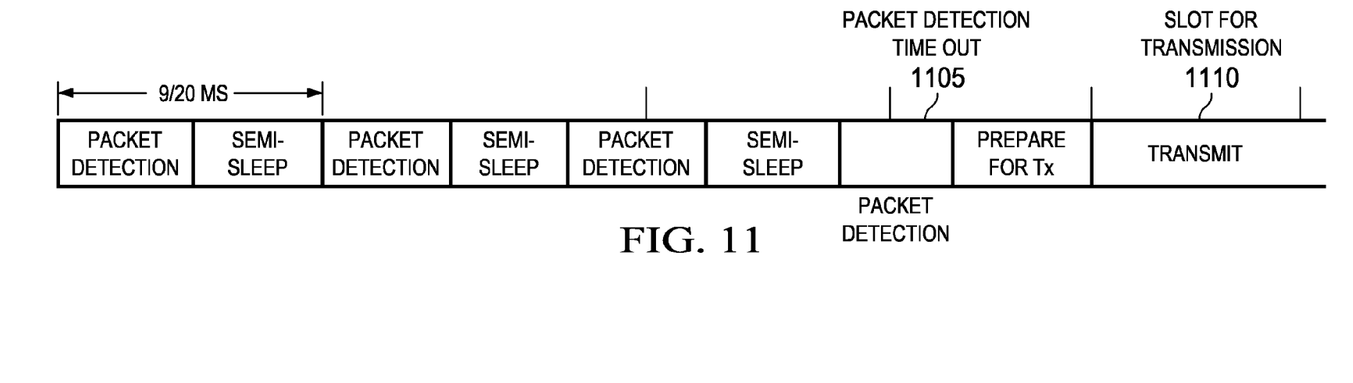
FIGS. 11 and 12 illustrate applications of the dynamic modes in various operating conditions of the transmitter according to various embodiments.

FIG. 11 illustrates the use of listen mode before packet transmission. In WLAN, before transmitting a packet, the transmitter chooses a random back-off counter and has to listen to the channel and ensure that there is no other transmission within that counter (counter value includes the number of slots). If there is no other transmission and the counter expires (indicated as packet detection timeout 1105), then the transmitter can transmit its packet (slot for transmission 1110). During the period before the counter expiry, the receiver can use the listen mode described above to switch between packet detection and semi-sleep mode to reduce current consumption.

Figure 12:
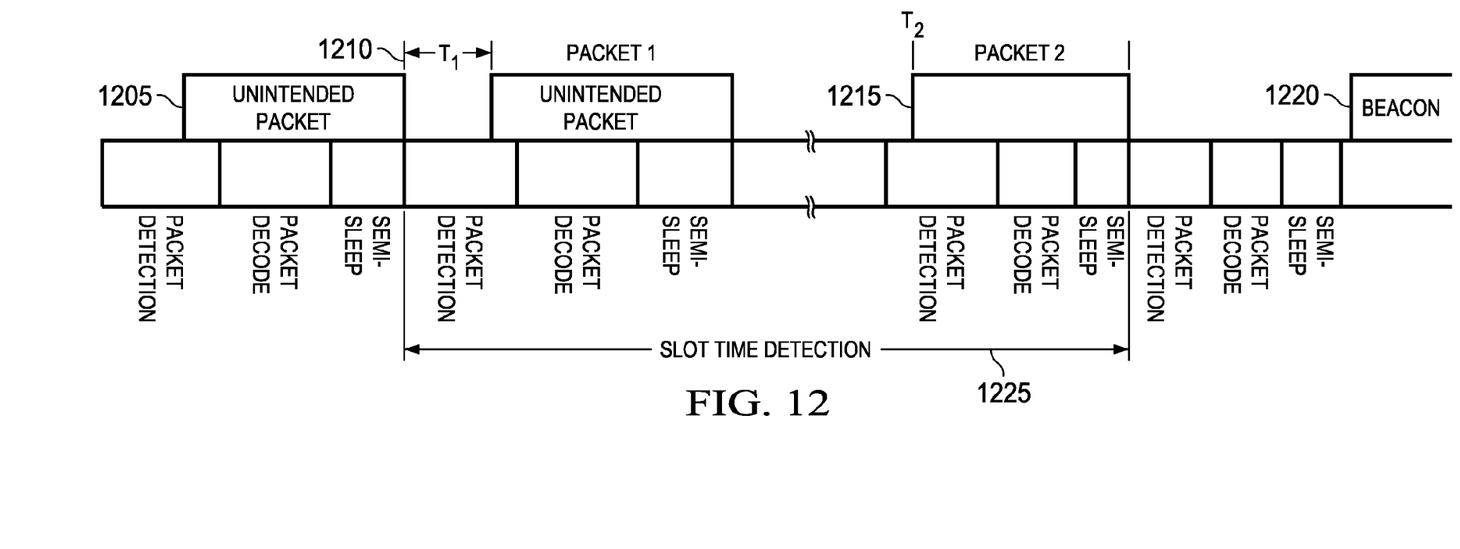

FIG. 12 illustrate applications of the dynamic modes in scan operating condition. In the scan condition, the STA wakes up at an arbitrary time and listens to the channel for receiving a beacon from the AP. If the beacon is received, the STA proceeds to associate with the AP. The inter-beacon time is typically 100 milliseconds and the STA, on an average, spends 50 milliseconds listening to the air before receiving a beacon. STA scans multiple channels. Hence, the total time spent listening to the channel can be significantly high. In order to reduce current consumption in this scenario, the listen mode current reduction methods can be used if the slot time is known and if the slot time synchronization is obtained. The end of a valid packet in the air gives the slot time synchronization. The slot time is known to be 9 microseconds in 802.11a and 20 microseconds in 802.11b. In 802.11g, the slot time can be 9 microseconds or 20 microseconds. This slot time can be estimated based on the arrival times of the packets with respect to the initial slot synchronization. In one embodiment, some time period can be allocated for detecting the slot time and this information may then be used to use the listen mode technique for current saving, which is illustrated in FIG. 12. Time period $T_1$ 1210 indicates the initial slot synchronization (between unintended packet 1205 and the next unintended packet) and time period 1225 indicates the time spent for slot time detection. Rest of the time is spent in listen mode before the beacon arrives. Even during slot time detection, since the STA does not care about the data in non-beacon packets, it can go to semi-sleep mode after decoding the header of the packets to determine their length.

In the foregoing discussion, the term "connected" means at least either a direct electrical connection between the devices connected or an indirect connection through one or more passive or active intermediary devices. The term "circuit" means at least either a single component or a multiplicity of components, either active or passive, that are connected together to provide a desired function. The term "signal" means at least one current, voltage, charge, data, or other signal.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A receiver in a packet based communication system, the receiver comprising:
    a programmable block;
    a detection block that detects at least one of an operating condition of the receiver and a protocol condition of the communication system;
    a control circuit coupled to the programmable block that controls the programmable block to transition to a set of radio modes according to at least one of the operating condition and the protocol condition, wherein the set of radio modes comprises a semi sleep mode, wherein the semi sleep mode corresponds to a silent state where the receiver is configured to be idle and ready for a rapid transition to any of the set of radio modes, wherein a performance of the programmable block is selectively degraded according to the operating condition to optimize power consumption;
    a register that stores relevant bits corresponding to a set of registers of the programmable block, wherein the relevant bits in the register are modified according to a transition between the set of radio modes that reduces transition time between the set of radio modes; and
    a bias circuit that is in active state to reduce the transition time.

2. The receiver of claim 1, wherein the operating condition comprises:
    at least one of an interference level in the receiver, strength of a received signal, multipath channel condition and a data rate of packets of the received signal.

3. The receiver of claim 1, wherein the protocol condition comprises:
    at least one of a listen state, a packet decode state and a silent state, wherein the listen state indicates a state when the receiver listens for a packet, the packet decode state indicates a state when the receiver decodes information in the packet, and the silent state indicates a state at least one of when data is known to be absent in a medium and when unnecessary data is present.

4. The receiver of claim 1, wherein the set of radio modes further comprises at least one of a packet detection mode, packet decoding mode, and a deep sleep mode.

5. The receiver of claim 4, wherein:
    the packet detection mode corresponds to the listen state; and
    the receiver attempts to detect a preamble of the packet in the packet detection mode.

6. The receiver of claim 4, wherein:
    the packet decoding mode corresponds to the packet decode state; and
    the receiver decodes information in a packet in the packet decoding mode.

7. The receiver of claim 4, wherein:
    the deep sleep mode corresponds to the silent state; and
    the receiver is deactivated in the deep sleep mode.

8. The receiver of claim 1, wherein:
    the semi sleep mode corresponds to the silent state; and
    the receiver is idle and is ready for a rapid transition to any of the set of radio modes while in the semi sleep mode.

9. A receiver in a packet based communication system, the receiver comprising:
    a programmable block;
    a detection block that detects at least one of an operating condition of the receiver and a protocol condition of the communication system;
    a control circuit coupled to the programmable block that controls the programmable block to transition to a set of radio modes according to at least one of the operating condition and the protocol condition, wherein the set of radio modes comprises at least one of a packet detection mode, packet decoding mode, semi sleep mode and a deep sleep mode, and wherein the semi sleep mode corresponds to a silent state where the receiver is configured to be idle and ready for a rapid transition to any of the set of radio modes, wherein each of the set of radio modes comprises a set of sub-radio modes based on the operating condition;
    a register that stores relevant bits corresponding to a set of registers of the programmable block, wherein the relevant bits in the register are modified according to a transition between the set of radio modes that reduces transition time between the set of radio modes; and
    a bias circuit that is in active state to reduce the transition time.

10. The receiver of claim 9, wherein each of the set of radio modes and the set of sub-radio modes is associated with a configuration of the programmable blocks configured by the control circuit.

11. The receiver of claim 10, wherein the control circuit controls the programmable block to transition between the set of radio modes based on changes in the protocol condition and between the set of sub-radio modes based on changes in the operating condition and wherein the packet based communication system is a wireless local area network (WLAN) system.

12. The receiver of claim 11, wherein the set of sub-radio modes comprises a typical interference low data rate mode, a high interference low data rate mode, a typical interference high data rate mode and a high interference high data rate mode.

13. The receiver of claim 9, wherein the protocol condition comprises: at least one of a listen state, a packet decode state and the silent state, wherein the listen state indicates a state when the receiver listens for a packet, the packet decode state indicates a state when the receiver decodes information in the packet, and the silent state indicates a state at least one of when data is known to be absent in a medium and when unnecessary data is present; and wherein the operating condition comprises: at least one of an interference level in the receiver, strength of a received signal, multipath channel condition and a data rate of packets of the received signal.

14. The receiver of claim 9 comprises a plurality of programmable blocks, wherein the plurality of programmable blocks comprises at least one of an analog block and a digital block.

15. The receiver of claim 14, wherein the plurality of programmable blocks comprise:
at least one of a low noise amplifier (LNA), a mixer, a phase locked loop (PLL), a local oscillation (LO) buffer, a divider, a variable gain amplifier (VGA) and an analog-to-digital converter (ADC).

16. The receiver of claim 9, wherein the control circuit controls the programmable block using a control signal, wherein the control signal comprises a digital signal.

17. A method comprising:
receiving an input signal in a receiver;
detecting at least one of an operating condition of the receiver and a protocol condition of a communication system;
controlling a programmable block to transition between a set of radio modes according to at least one of the operating condition and the protocol condition, wherein the set of radio modes comprises a semi sleep mode wherein the semi sleep mode corresponds to a silent state where the receiver is configured to be idle and ready for a rapid transition to any of the set of radio modes; and
degrading a performance of the programmable block, selectively, according to the operating condition to optimize power consumption wherein a set of bias circuits corresponding to a set of analog baseband blocks are always ON in the semi sleep mode to enable rapid transition.

18. The method of claim 17, wherein:
detecting an operating condition comprises detecting at least one of an interference level in the receiver, strength of a received signal, multipath channel condition and a data rate of packets of the received signal; and
detecting the protocol condition of the communication system comprises detecting at least one of a listen state, a packet decode state and a silent state, wherein the listen state indicates a state when the receiver listens for a packet, the packet decode state indicates a state when the receiver decodes information in the packet, and the silent state indicates a state when data is known to be absent in a medium and when unnecessary data is present.

19. The method of claim 17, wherein controlling the programmable block to transition to a set of radio modes comprises:
controlling the programmable block to transition to at least one of a packet detection mode, packet decoding mode, semi sleep mode and a deep sleep mode.

20. The method of claim 17, wherein controlling the programmable block to transition to a set of radio modes comprises controlling the programmable block to transition to at least one of a packet detection mode, packet decoding mode, semi sleep mode and a deep sleep mode.

21. A method for using a set of radio modes, the method comprising:
detecting an operating condition, comprising detecting at least one of an interference level in a receiver, strength of a received signal, multipath channel condition and a data rate of packets of the received signal;
detecting a protocol condition of the communication system, comprising detecting at least one of a listen state, a packet decode state and a silent state, wherein the listen state indicates a state when the receiver listens for a packet, the packet decode state indicates a state when the receiver decodes information in the packet, and the silent state indicates a state when data is known to be absent in a medium and when unnecessary data is present; and
selecting the set of radio modes according to the operating condition and the protocol condition, wherein the set of radio modes comprises at least one of a packet detection mode, a packet decoding mode, a semi sleep mode and a deep sleep mode, wherein:
selecting the packet detection mode comprises choosing the packet detection mode when the receiver is in the listen state and is attempting to detect a preamble of the packet;
selecting the packet decoding mode comprises choosing the packet decoding mode when the receiver is in the decode state and decoding the information in the packet;
selecting the semi sleep mode comprises choosing the semi sleep mode when the receiver is in the silent state and idling the receiver that is prepared for a rapid transition to any of the set of radio modes; and
selecting the deep sleep mode comprises choosing the deep sleep mode when the receiver is in the silent state and deactivating the receiver.

22. The method of claim 21, further comprising:
storing relevant bits corresponding to a set of registers of a programmable block in a register;
changing the register so that the relevant bits are modified quickly during a transition of the set of radio modes for reducing transition time between the set of radio modes;
maintaining the programmable block that takes longer settling time in ON state to reduce the transition time; and
maintaining a bias circuit of the programmable blocks, that take longer settling time, in ON state to reduce transition time.

* * * * *